Sept. 3, 1968 L. S. GRECO ET AL 3,399,509
BLISTER PACKAGE SEALER
Filed Oct. 15, 1965 3 Sheets-Sheet 1
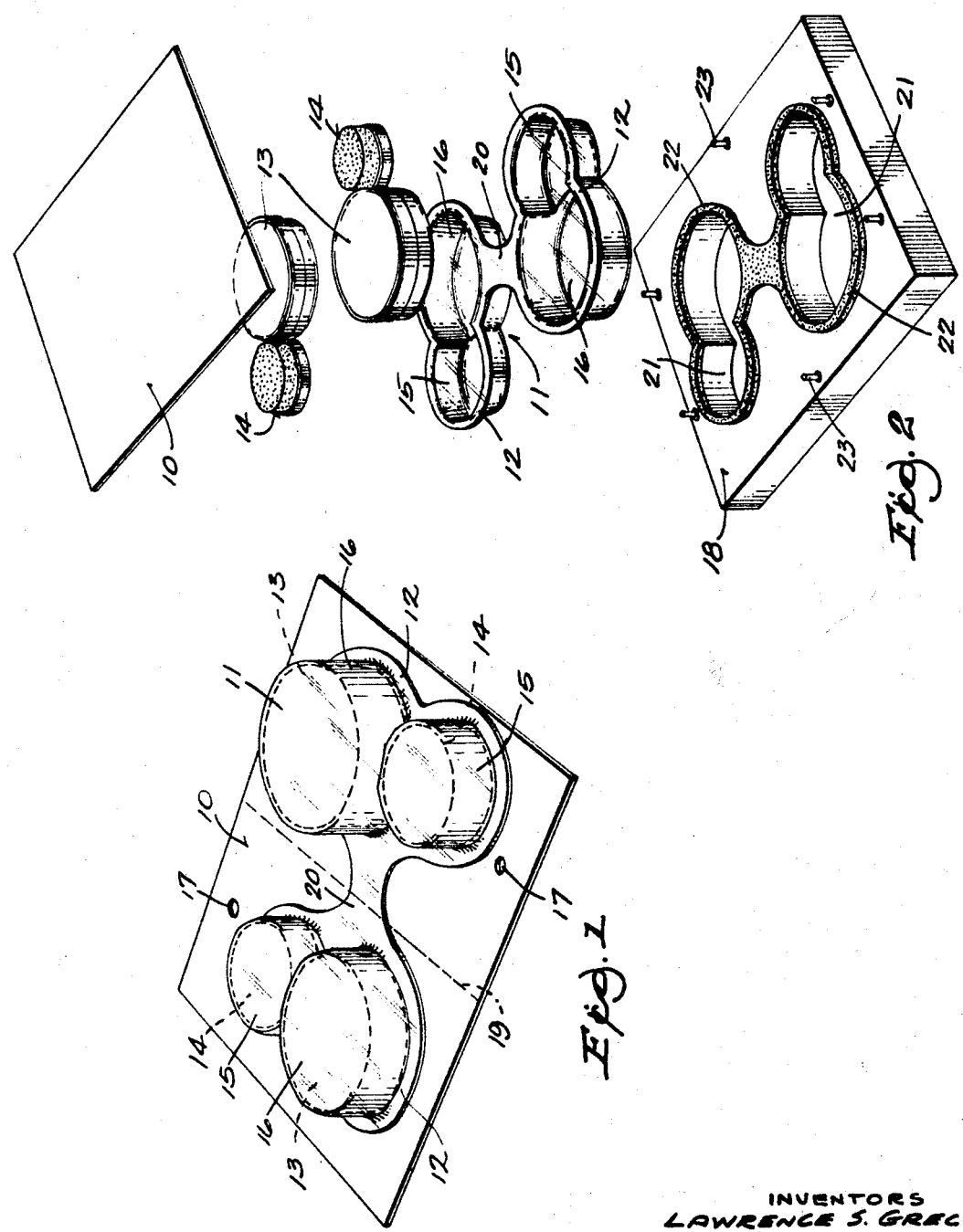
INVENTORS
LAWRENCE S. GRECO
RICHARD G. WELLS
BY Wheeler, Wheeler + Wheeler
ATTORNEYS

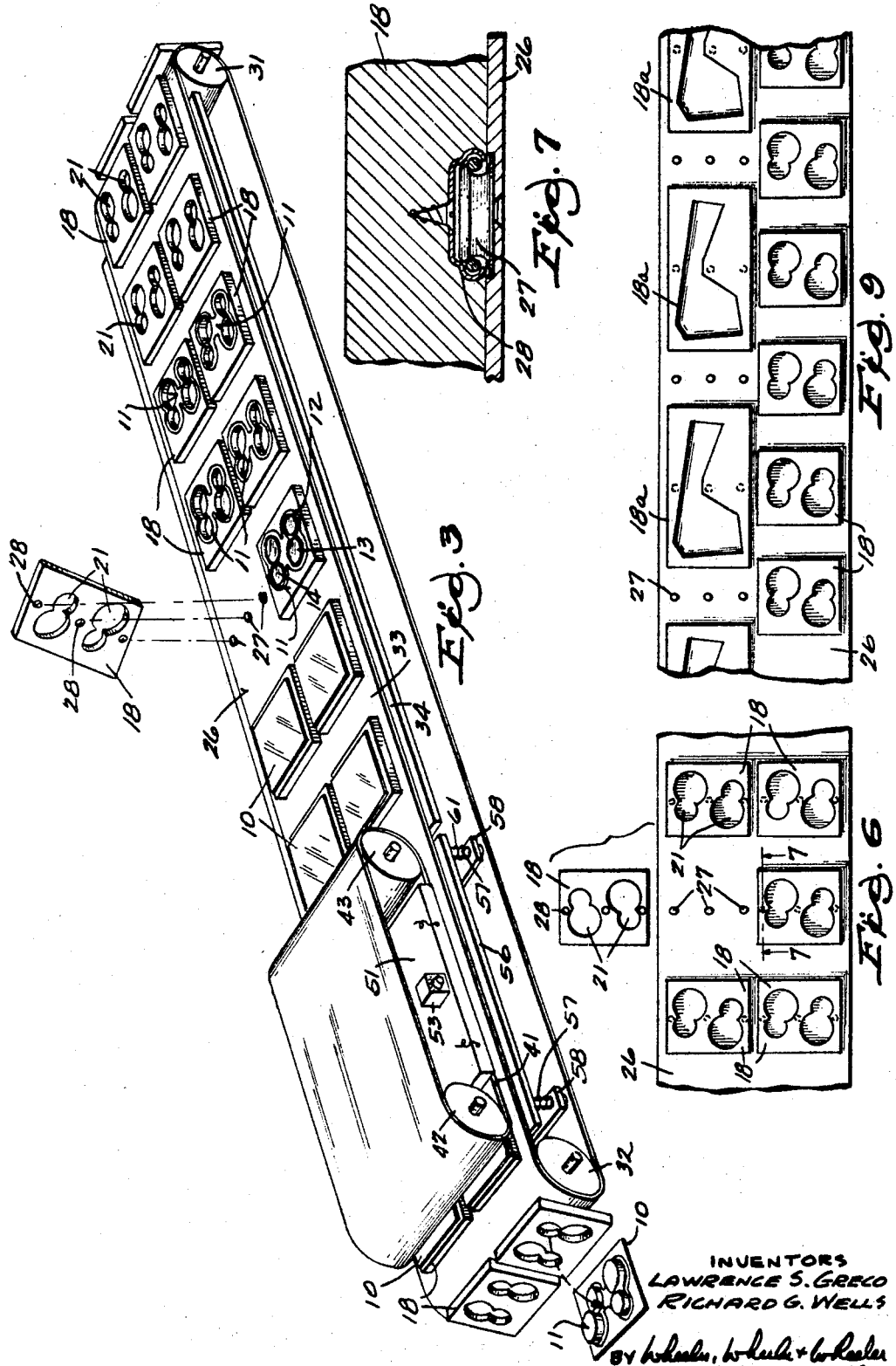

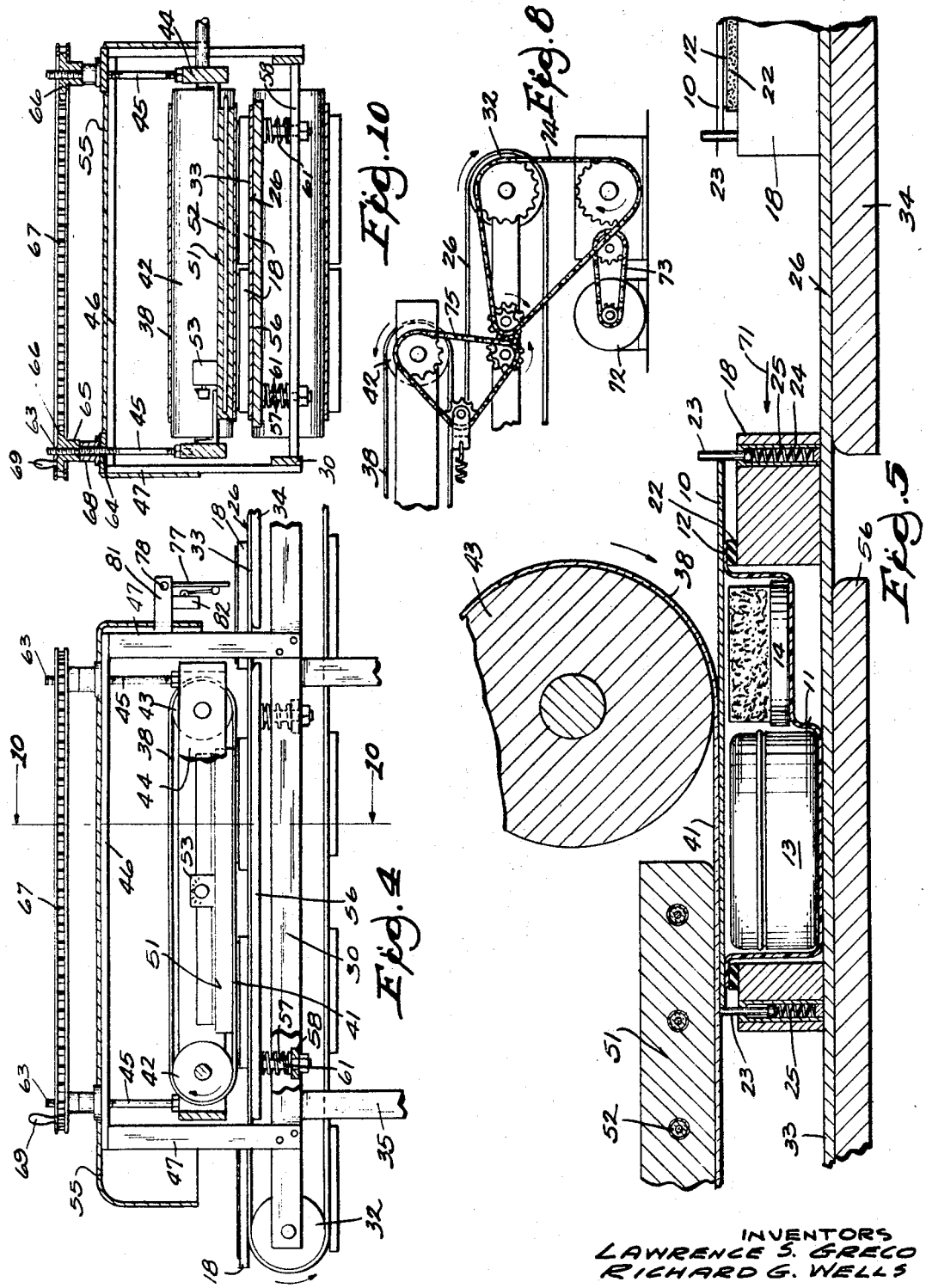

United States Patent Office 3,399,509
Patented Sept. 3, 1968

3,399,509
BLISTER PACKAGE SEALER
Lawrence S. Greco, Mequon, and Richard G. Wells, Milwaukee, Wis., assignors to Wells Badger Industries, Inc., a corporation of Wisconsin
Filed Oct. 15, 1965, Ser. No. 496,539
9 Claims. (Cl. 53—388)

ABSTRACT OF THE DISCLOSURE

This disclosure relates to a blister package sealer having continously moving belt conveyor carrying a series of die fixtures attached to the belt conveyor by gripper fastener elements aligned on the transverse medial axes of the fixtures. The belt conveyor moves beneath a continuously moving presser belt which is heated to seal blisters and cartons contained in the die fixtures.

This invention relates to a blister package sealer.

Prior blister package sealers known to us have been characterized by an intermittently moving horizontal conveyor which passes beneath a vertically reciprocating heat sealing platen, the device shown in United States Patent 3,092,945 being typical. Such prior art sealers are limited in capacity and in speed of operation. This is because a finite period of time is required to effectuate the heat seal. The conveyor is stopped during this period.

The blister package sealer of the present invention has a continuously moving belt conveyor which carries a series of die fixtures containing a corresponding series of plastic blisters and backing cards beneath a continuously moving, heated presser belt or the like. The die fixtures and contained blister and cards advance continuously while subject to the heat and pressure of the presser belt. As the blister package product exits from the presser belt, sealing has been completed, and the sealed product is then discharged from the machine. The conveyor moves during the time required to effectuate the heat seal, thus maintaining speed of operation and simplification of the apparatus.

Blister packages sealed on the apparatus of the present invention are processed at a considerably lower cost than on the prior art machines aforesaid because of the greater speed of operation and volume output achieved by the machine of the present invention.

Another advantage of the blister package sealer of the present invention resides in its versatility in that different products can be processed concurrently. This is because there is no need for any timing between the conveyor belt and the presser belt, unlike the prior art sealers in which the advance of the work pieces on the conveyor must be timed with the action of the sealing head. Accordingly, an important feature of the instant apparatus is the non-timed or asynchronous relation between the conveyor belt and the presser belt. This advantage of the instant invention could not be achieved in any device having parts on a conveyor and a sealing head which must mate to effectuate sealing.

Other objects, features and advantages of the invention will appear from the following disclosure in which:

FIG. 1 is a perspective view of a blister package, as sealed on the sealer of the present invention.

FIG. 2 is an exploded view of the various components of the blister package in course of their assembly on a die fixture.

FIG. 3 is a perspective view of a blister package sealer embodying the present invention.

FIG. 4 is an enlarged fragmentary elevation of the tail end of the machine of FIG. 3, parts being broken away and shown in cross section.

FIG. 5 is a further enlarged fragmentary view, partly in cross section, showing a die fixture and contained blister and card work piece as it enters the bight between the presser belt and the conveyor belt.

FIG. 6 is a fragmentary plan view of the belt conveyor illustrating certain die fixtures attached thereto and another die fixture in the course of attachment.

FIG. 7 is a fragmentary cross section taken along the line 7—7 of FIG. 6.

FIG. 8 is a diagrammatic view of the drive connections for the various moving parts of the device.

FIG. 9 is a view similar to FIG. 6, but showing different sizes of fixtures on adjacent lanes on the belt conveyor.

FIG. 10 is an elevational sectional view of a portion of the device, taken along line 10—10 of FIG. 4.

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

FIG. 1 illustrates a typical blister package comprising a display or backing card 10 to which a plastic "blister" 11 is sealed by its out-turned flange 12. In the disclosed package, as shown in FIG. 2, there are two dissimilarly sized products 13, 14 received within correspondingly dissimilarly sized blister cells 15, 16.

The blister 11 is typically formed on a vacuum former, not shown, and is supplied to the machine of the present invention in its form shown in FIG. 2. The article or product 13 may typically comprise a can of shoe polish, and the article or product 14 may comprise a smaller can containing a dauber. Both of these are to be packaged together on the cardboard card 10 which may contain advertising display indicia. As shown in FIG. 1, the card is provided with a score line 19, and the blister 11 is provided with a thin web 20, thus to facilitate separating the product shown in FIG. 1 along the score line 19 so that there will ultimately be two cards, each with a can of shoe polish and a dauber mounted on the card beneath the twin-cell blister 11.

Each card half has an eyelet hole 17 by which the card may be hung on a point of sale display bracket.

As processed on the sealer apparatus of the present invention, the blister, card and product are all assembled in a die platen or fixture 18, the assembly constituting a work piece on which the sealer acts. Fixture 18 desirably consists simply of a wooden board having cavities 21 shaped to receive the multicell blister, as shown in FIGS. 2 and 5. A spacer gasket 22 of Teflon coated on neoprene rubber or on fiber or the like and shaped to register with the flange 12 of the blister is first assembled on the fixture 18. Gasket 22 precludes adherence of the blister to the fixture 18. The inverted blister 11 is then set into the cavity 21 with its flange 12 overlying the gasket 22. The product items 13, 14 are then inserted into the inverted blister cells 15, 16 and the whole overlaid with the card 10.

As shown in FIGS. 2 and 5, the fixture 18 is provided with card locating pegs 23 which are mounted in sockets 24 disposed near the edges of the fixture 18. Pegs 23 project above the upper face of the fixture board 18 under pressure of springs 25. The locating pegs 23 are retractable against the pressure of the springs 25 as the fixtures and contained work pieces pass beneath the presser belt 38, as is shown at the left side of FIG. 5.

The sealing apparatus of the present invention comprises a continuously moving conveyor belt 26 which is provided with gripper coupling heads 27. The respective fixtures 18 are provided on their undersurfaces with complementary gripper coupling sockets 28. As shown in FIG.

6, the gropper heads 27 are disposed in rows extending laterally across the belt 26. The rows are spaced longitudinally a sufficient distance so that various sizes of die fixtures 18 may be received on the belt without interference one with the other. The gripper sockets 28 are disposed on straight lines laterally across the undersurface of the fixtures 18, on their transverse medial axes, so that the fixtures 18 can easily be releasably coupled to the complementary gripper heads on the belt 26.

Various sizes of fixtures 18 will be provided, depending upon the size and shape of the product and blister.

Belt 26 is an endless belt power driven to travel over end rollers 31, 32. The belt 26 has a substantially flat upper working run 33 which is slidably supported on table 34. The table is elevated from the floor on a frame 30 having legs 35. Near its tail end roller 32, the working run 33 of belt 26 passes beneath a presser belt 38 which has a complementary working run 41 which is in spaced parallel relation to the working run 33 of belt 26. As shown in FIG. 5, this space is substantially equal to the combined thickness of the fixture 18, gasket 22, blister flange 12 and card 10.

Presser belt 38 travels about a front roller 42 and a rear roller 43, both of which are mounted on a subframe 44 which is suspended on a series of four posts 45 from a bridge 46 which is mounted on the main frame 30 by legs 47.

The subframe 44 also supports a heated platen 51 which extends horizontally between the rollers 42, 43. Platen 51 is substantially co-extensive in area with the working run 41 of belt 38. Imbedded within the platen 51 are electrical heating elements 52. These desirably maintain the heated platen 51 at approximately 350° F. A thermostat 53 may be provided to maintain the heat constant at any temperature to which it is adjusted. This will depend upon the speed of operation of the belt, the nature of the product being sealed, etc.

Beneath platen 51, the belt 26 passes over a yieldable support apron or platen 56 supported at its respective corners on resilient mountings. These consist of guide stems 57 which project downwardly from the apron or platen 56 through guide openings in cross rails 58. Coil springs 61 are interposed between the cross rails 58 and the apron. These bias the apron 56 upwardly to engage adjustable stop nuts 62 on the lowermost ends of the stems 57 with the undersurface of the rails 58 to define the uppermost level of the apron 56. Accordingly, the apron 56 may yield downwardly against the pressure of the springs 61 as the fixtures 18 and their contained work pieces pass thereover. The springs 61 maintain resilient pressure between the work pieces and the presser belt 38 to insure good heat conduction therebetween, and to yieldingly accommodate for slight differences in thickness of the various work pieces.

The posts 45 for the subframe 44 of the presser belt 38 respectively have their upper ends threaded at 63. These threaded ends pass through larger openings 64 in the bridge 46. Near their upper ends, the threads 63 engage nuts 65 having sprockets 66 thereon. A chain 67 interconnects the sprockets 66 on each nut 65. The respective nuts 65 support the posts 45 on thrust bearing sleeves 68. If it is desired to adjust the subframe 44 up or down, chain 67 may be driven by handle 69 on one of the sprockets 66 to concurrently turn all sprockets 66, thus to raise or lower the frame 44 and platen 51.

In this manner, the presser belt 38 may be vertically adjusted to change the space between its platen 51 and the apron 56 to accommodate work pieces and fixtures of varying over-all vertical dimension.

As shown in FIG. 5, the cooperating runs 33, 41 of belts 26, 38 travel continuously in the direction of arrow 71. As the fixture 18 passes beneath roller 43, its pegs 23 will retract within the fixture sockets 24 against the pressure of springs 25. The belts 38, 26 travel at the same lineal speed. This is because their respective feed rollers 32, 42 are driven from the same motor 72 through the respective drive chains 73, 74, 75, as shown in FIG. 8.

Belt 38 desirably comprises a web of thin woven fiberglass with a Teflon coating. In a practical embodiment of the invention, belt 38 is .006 inch thick. The Teflon coating provides good heat conduction and non-sticking characteristics. It will transmit the heat from the heated platen 51 to the cardboard 10 and thence to the plastic blister 11, thus to heat seal or adhere the blister flange 12 to the cardboard 10. The gasket 22 prevents the blister from adhering to the die fixture 18.

The spaced platens 51, 56 define a heating chamber having moving walls 33, 41 which grip the work piece to pass it through the chamber. A typical exposure is three or four seconds, this being ample to heat seal the blister to the cardboard. The work piece is continuously exposed to the heat of platen 51 during this period. The Teflon coated belt 38 will retain some of the heat imparted thereto by the heated platen 51. It has a relatively short return run, compared to the return run of the conveyor belt 26, so that it will not lose all of its heat as it returns over the top of the rollers 42, 43. The mass of the platen 51 functions as a heat sink to maintain a relatively constant platen temperature to which the product is continuously exposed by conduction through belt 38 as it travels through the heating chamber. To retain heat about the heating chamber and the return run of belt 38, an insulated casing 55 is desirably provided.

The table 34 which extends from the infeed end of the heating chamber defines a loading zone for the work pieces. Human operators are stationed adjacent the table 34 to manually load the blisters, product and card into the fixtures 18 as they pass on the belt 26 over the table 34.

By reason of the fact that the fixtures 18 are attached to the belt 26 only along their transverse medial axes on the laterally extending rows of grippers 27, the fixtures 18 easily negotiate the corners where the belts 26 pass around the rollers 31, 32.

In the disclosed embodiment, two longitudinal lanes of fixtures 18 are illustrated as respectively attached to the side margins of single belt 26. The apparatus can be made wider if additional lanes are to be provided. Where multiple lanes are provided, different products can be concurrently blister sealed in each lane.

This is illustrated in FIG. 9 in which fixtures 18 are aligned in one lane along one margin of the belt 26 and much larger fixtures 18a are aligned in a parallel lane along the other margin of the belt. Work pieces in both lanes of fixtures 18 and 18a are heat sealed concurrently in the heating chamber, even though the over-all size of the fixtures 18 and 18a are quite dissimilar. This is made possible because of the non-timed or asynchronous relation between the upper and lower belts 38, 26.

Even though fixtures 18a are much larger than fixtures 18, they will still negotiate the corners around rollers 31, 32, because they are coupled to the belt 26 only along their transverse medial axes on the lateral rows of grippers 27, 28. Should the fixtures 18a be too long to negotiate the corners, their coupling to the belt could be omitted and the fixtures 18a recovered on a separate return conveyor. Where the heating chamber has a uniform height, of course, the fixtures 18 and 18a must have the same vertical dimension. This does not preclude blister receiving cavities therein of different depth.

As best shown in FIG. 4, a safety gate 77 is desirably mounted on the leg 47 near the entrance to the heating chamber. Gate 77 is pivotally mounted on pintle 78 from bracket 81. Gate 77 will prevent an operator's hand from getting into the heating chamber. If the operator's hand does strike the gate 77, it will swing on its pintle 78 to actuate control switch 82 which is in the circuit to the motor 72 to discontinue drive to the belts 26, 38. Gate 77 is also actuated by a misaligned work piece or product which projects upwardly to contact the gate and actuate control switch 82.

By reason of the elongation of the heated platen 51 so it is substantially co-extensive with the working run 41 of the presser belt 38, heat will be applied continuously to the work pieces while they are conveyed through the heating chamber. This heat is applied directly by conduction through the working run 41 of belt 38, thus to be most effective to seal the blister to the display card, with minimum loss of heat to the atmosphere and the work spaces about the sealer.

The blisters 11 may be made of any heat sealable plastic material, such as cellulose acetate or clear polyvinyl plastic. The cards 10 are desirably made of stiff paper which is coated with a resin-base film which is compatible to the blister and is activated by heat.

The work piece loading and assembly sequence is indicated in FIG. 3. Unfilled fixtures 18 are at the far end of the table 34. Human operators stationed at the sides of the table 34 then position gaskets 22 and inverted blisters 11 on the fixtures. Next the products 13, 14 are loaded into the blister cells and finally the cards 10 are placed over the blisters and contained product just prior to work piece entry into the heating chamber.

What is claimed is:

1. A blister package sealer for sealing an article enclosing plastic blister to a display card, said sealer comprising:
    a moving belt conveyor having a substantially flat working run,
    a series of die fixtures on said belt conveyor on which a corresponding series of blisters and cards are carried along said working run,
    said die fixtures having gripper fastener elements on the undersurfaces thereof, said belt conveyor having complementary gripper fastener elements on the surface thereof for releasably connecting the die fixtures to the belt, said gripper fastener elements comprising heads and sockets, said fastener elements being aligned on the transverse medial axes of said fixtures,
    a support platen across which the working run of the belt conveyor moves,
    a moving presser belt having a substantially flat working run complementary to the working run of the belt conveyor and spaced therefrom a distance substantially equal to the combined thickness of a die fixture, blister and card,
    and a heater for the blisters and cards between said belts to heat seal the same together.

2. The blister package sealer of claim 1 in which said heater comprises a back-up platen for the presser belt to transmit heat to the blister through said presser belt.

3. The blister package sealer of claim 1 in which the said support platen is provided with a yieldable resilient mounting.

4. The blister package sealer of claim 1 in which the working run of the presser belt is shorter than the working run of the belt conveyor, the space between said runs comprising a heating chamber and the space about the remaining portion of the working run of the conveyor constituting a loading zone.

5. The blister package sealer of claim 1 in which the working run of the presser belt is provided with a back-up platen substantially co-extensive with said working run and across which said run moves, and means for adjusting the spacing between said platens.

6. The blister package sealer of claim 5 in which the heater is incorporated within the back-up platen for the working run of the presser belt, thus to transmit heat to the blisters and cards through said back-up platen and run continuously while the blisters and cards are in pressure contact with said run.

7. The blister package sealer of claim 5 in which the means for adjusting the spacing between said platens comprises a subframe on which the presser belt platen is mounted, a fixed main frame on which the belt conveyor and its support platen are mounted, corner posts interconnecting the main frame and subframe and means for concurrently adjusting the coupling of the corner posts to the main frame to raise or lower the subframe.

8. The blister package sealer of claim 7 in which the posts have threaded portions, sprocket nuts threaded on said portions and a chain about the sprockets.

9. A blister package sealer according to claim 1, in combination with means to drive the working runs of said belts in the same direction and in asynchronous timed relation whereby work pieces of different sizes may be concurrently heat sealed on said sealer.

References Cited

UNITED STATES PATENTS

| | | | |
|---|---|---|---|
| 2,710,641 | 6/1955 | Stickelber | 53—388 |
| 3,186,142 | 6/1965 | Borgardt et al. | 53—373 |
| 3,232,024 | 2/1966 | Brown | 53—184 |

TRAVIS S. McGEHEE, *Primary Examiner.*

E. F. DESMOND, *Assistant Examiner.*